Dec. 17, 1957 V. L. HARRIS ET AL 2,816,386
FISHING TRAWL
Filed Jan. 5, 1956
FIG. 2 (CONVENTIONAL)
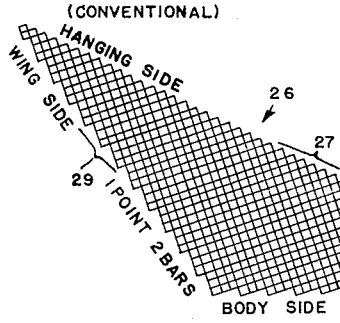
FIG. 4 (CONVENTIONAL)
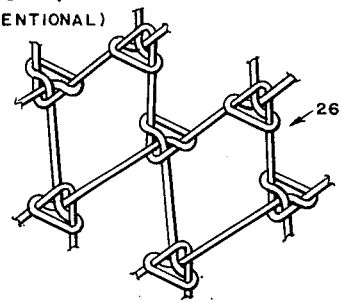
INVENTORS
VERNICE L. HARRIS
RUDOLPH C. RHODES
BY A. Yates Dowell
ATTORNEY

United States Patent Office 2,816,386
Patented Dec. 17, 1957

2,816,386

FISHING TRAWL

Vernice L. Harris and Rudolph C. Rhodes, Freeport, Tex.

Application January 5, 1956, Serial No. 557,467

5 Claims. (Cl. 43—9)

This invention relates to fishing and more particularly to a trawl or net of the type which is towed behind a boat and has an open mouth to trap fish, shrimp, or the like in large quantities.

This invention specifically relates to the arrangement of the netting in a jib, corner or bat of a flat trawl manufactured from a plurality of sections of netting.

In recent years, fishermen have been using trawls made from a plurality of cut sections of machine-made netting due to the lesser cost of such a trawl as compared to a handmade trawl which is shaped as it is knitted. The sectional trawls have been satisfactory to a degree, but some of the sections of the trawls have tended to deform under use.

Such deformation has shortened the lives of the trawls, reduced their efficiency, and necessitated their rehanging more frequently. Another characteristic of previous trawls has been a tendency to tear when loaded with fish or shrimp, or when bogged down in the mud during use. Particular sections of the trawl which were found to have undesirable characteristics were the corner or jib sections.

An object of this invention is to provide a trawl, particularly of the flat type, having an improved jib which will not deform during the trawling operation and which will have greater strength than those previously in use.

A further object of this invention is to provide a trawl having improved ability to carry heavy loads, that does not require frequent rehanging, and whose efficiency remains high during its useful life.

Figure 1:
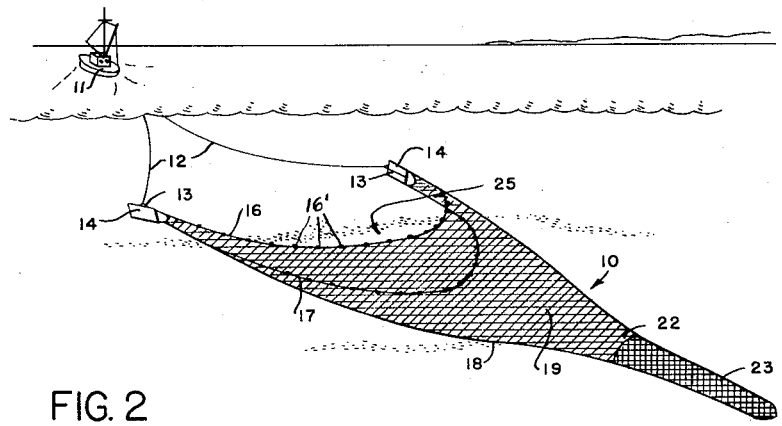
Figure 3:
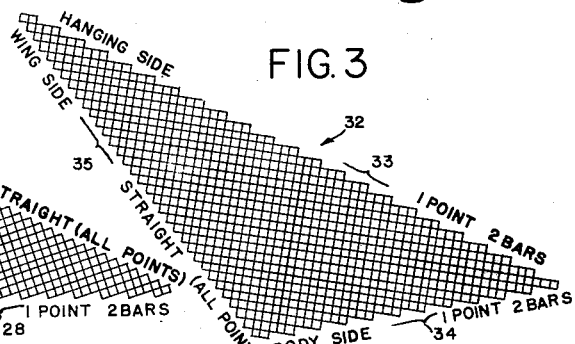
Figure 5:
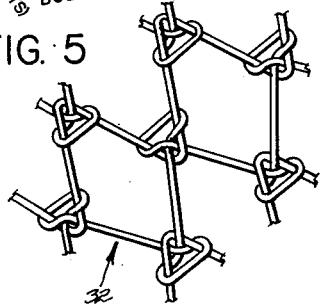
Figures 6A, 6B:
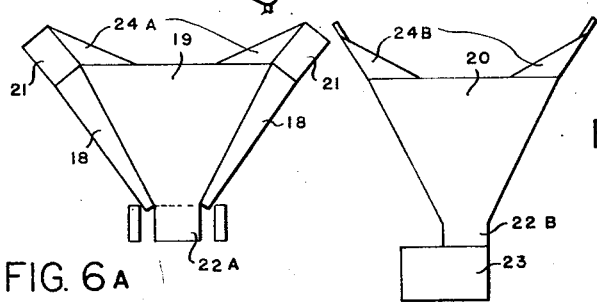

Other objects and advantages of the invention will be apparent from the following description taken in conjunction with the accompanying drawing wherein:

Fig. 1 is a perspective illustrating a boat towing a trawl through the water in fishing position;

Fig. 2, a plan view of a conventional jib or corner for a flat trawl, shown for comparative purposes;

Fig. 3, a plan view of a jib for a flat trawl according to one form of the present invention;

Fig. 4, an enlarged detail of the netting of Fig. 2 illustrated in the position corresponding to that of Fig. 2;

Fig. 5, an enlarged detail of the netting of Fig. 3 illustrated in the position corresponding to that of Fig. 3;

Fig. 6(a), a layout of the top and sides of a sectional trawl; and

Fig. 6(b), a layout of the bottom portion of the trawl.

Briefly stated, this invention relates to the portions known as jibs, corners or bats, of a trawling net, consisting of a plurality of individually cut sections of netting. These sections of netting after being cut are then joined together by sewing or other equivalent means. Applicant has discovered that the cause of the deformation and weakness in conventional trawling nets is the arrangement of the netting in the jibs and has found that this may be remedied by rearranging the jib netting in such a way that the principal pull is in the direction of straight twine, i. e., in the direction which tightens the knots. Straight twine is perpendicular to cross-twine, the latter being parallel to the direction of pull which tends to loosen the knots. The terms "straight twine," "cross-twine," and "points" are defined in "Fishery Leaflets" Nos. 241 and 394, published by the Fish and Wild Life Services, U. S. Dept. of The Interior.

Referring to the drawing, a fishing trawl 10 is illustrated in Figure 1 being towed by a fishing boat generally known as a trawler 11. Trawling cables 12 are attached to the trawler 11 and extend rearwardly to bridle chains 13 which are attached to the doors or otter boards 14, the ends of the lines on which the trawl 10 is hung being tied to the doors 14. The trawl has a cork line 16, the upper line on which the trawl is hung, and a lower or lead line 17. The sides of the trawl are known as the wings 18, whereas the top and bottom tapered part of the trawl extending from wing to wing are known as the top body 19 and the bottom body 20.

As further illustrated in Figs. 1, 6(a), and 6(b), the trawl has forward untapered wing portions or tips 21, a constricted portion of the body or throat 22, and a rearmost portion or tail 23, the latter being a cylinder closed at its end.

The triangular portions of netting 24(a) and 24(b) which are joined between the wing tips 21 and the top body 19, and bottom body 20, respectively, are referred to as jibs, corners or bats. The forward part of the trawl extending between the lines is known as the mouth 25. Cork line 16 is hung or attached to the free or forward edges of the upper jib 24(a) and the top body 19; lead line 17 is attached to the forward edge of the lower jibs 24(b) and bottom body 20. The jibs uniformly distribute the force between the cork and lead lines and the netting of the trawl to cause the mouth of the trawl to properly open and remain in this position without causing undue stresses throughout the netting.

In use the bridle chains 13 are attached to the trawling cables 12 which are attached to the doors 14 to cause the doors to hold the mouth 25 of the trawl 10 open as it is towed through the water. Floats 16' are mounted on the cork line 16 to hold it up and away from the lead line 17 whereas weights are mounted on the lead line 17 to hold it to the bottom of the fishing grounds. Flat trawls "scour" or move in close proximity to the bottom, as is well known.

The conventional jib 26 illustrated in Figs. 2 and 4 has a hanging side 27, a body connecting side 28 and a wing connecting side 29. The netting in a conventional jib 26 is arranged so that the hanging side 27 is straight, that is, it terminates entirely in two legged points 30. A point is a netting knot with two legs, whereas a three or one legged knot is known as a bar. The body and wing connecting sides of the conventional jib 26 are tapered and therefore consist of a combination of points and bars. In the illustration, both the body side and the wing side are tapered one point, two bars. As illustrated in Figs. 2 and 4, straight twine extends parallel to the hanging edge 27.

A jib 32, according to the present invention, is illustrated in Figs. 3 and 5, and comprises a hanging side 33, a body side 34, and a wing side 35. The netting of this jib 32 is arranged so that it is straight (all points) along the wing side 35, whereas it is tapered by a combination of points and bars, such as one point, two bars, along the hanging side 33 and the body side 34. The net illustrated in Figs. 3 and 5, therefore, has the direction of straight twine parallel to the wing side 35.

In transmitting tensile forces through netting, it is preferable to apply these in the direction in which the knots of the netting tend to tighten rather than loosen, in order that the netting offers the maximum strength and does not tend to deform. As can be seen from analyzing the netting of Figs. 2 and 4, the application of tensile force parallel to the wing side includes a substantial cross-twine component, and this tends to loosen the knots and consequently to deform the meshes.

Apparently it has previously been thought to be necessary to arrange the netting in jibs for flat trawls as described, for various reasons, possibly because of a misconception regarding the direction of forces therein, the netting not being visible for close examination during trawling. However, it has been found that the conventional jib 26 tended to deform and required frequent rehangings to restore it to condition for further use. This deformation also shortens the useful life of the trawl. Before applicant's invention, this tendency to deform has been regarded as a defect which could not be corrected. However, applicant has produced an improved net in which this defect has been overcome.

Applicant has found that the direction of maximum stress through the jib extends substantially parallel to the wing side 35 of the jib 32. Consequently, the direction of straight twine has been arranged to extend substantially parallel to the wing side and it has been found that the modified jib does not have the defects of the conventional jib. Applicant has found that the jib 32 does not deform and consequently rarely requires rehanging as its efficiency remains high without frequent rehanging. Further it offers the maximum strength and will not tear or loosen as readily as conventional jibs under heavy loads.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A flat trawl comprising a top body section, a bottom body section, a pair of wing sections joining said top body section to said bottom body section at the sides thereof, a tail section joined to the narrow end of said body sections, and a jib or corner section at each upper and lower corner, each comprising a triangular piece of netting having a body connected side, a wing connected side, and a hanging side connected to the line on which the trawl is hung, the netting in said jib being arranged so that it terminates entirely in points along said wing side and is tapered one point two bars along its hanging and body sides, the direction of straight twine extending substantially parallel to the wing side, so that said jib will offer its greatest resistance to tensile stress applied to it during the use of the trawl.

2. In a flat trawl, a jib or corner comprising a triangular portion of netting having a body side where it joins to the body of the trawl, a wing side where it joins to the wing of the trawl and a hanging side where it joins with the line on which said trawl is hung, the direction of straight twine of said netting extending substantially parallel to said wing side whereby said jib will offer the maximum resistance to deformation of said netting during the trawling operation.

3. A flat trawl jib or corner adapted to be used with a sectional manufactured trawl, comprising a triangular piece of netting having a trawl body side, a trawl wing side, and a line hanging side, the angle between said wing and body sides being an obtuse angle, said netting being arranged so that it terminates in all two legged points along said wing side and the direction of straight twine extending substantially parallel to said wing side so that said jib will offer the maximum resistance to deformation during the trawling operation.

4. In a flat trawl, the improvement comprising jibs having body, wing, and hanging sides in which the hanging side is tapered, the wing side straight, and the direction of straight twine extends substantially parallel to the wing side.

5. In a flat trawl, a jib or corner comprising a triangular portion of netting having a body side where it joins to the body of the trawl, a wing side where it joins to the wing of the trawl and a hanging side where it joins with the line on which said trawl is hung, the netting on the wing side terminating entirely in points, said netting being tapered along its body and hanging sides.

References Cited in the file of this patent

FOREIGN PATENTS 19,936  Netherlands _____ June 15, 1929